Oct. 21, 1958  J. H. THOMAS  2,857,136
METHOD AND APPARATUS FOR REMOVING
A TRACTION CLIP FROM A TIRE
Filed Aug. 4, 1954

INVENTOR:
JOHN H. THOMAS,
BY: Donald G. Dalton
his Attorney.

United States Patent Office 2,857,136
Patented Oct. 21, 1958

2,857,136

METHOD AND APPARATUS FOR REMOVING A TRACTION CLIP FROM A TIRE

John H. Thomas, North Chicago, Ill., assignor to United States Steel Corporation, a corporation of New Jersey Application August 4, 1954, Serial No. 447,698

2 Claims. (Cl. 254—131)

This invention relates to a method and apparatus for removing a traction clip from a tire and more particularly for removing U-shaped traction clips such as shown in the La Rocca Patent No. 2,625,193, dated January 13, 1953. The traction clip shown therein is made of a wire loop of substantially square shape bent into a U-shape with the sides of the U gripping the tire firmly and the base of the U providing the traction. The device engages the tire firmly and is difficult to remove with ordinary tools. Prior to my invention these clips were removed by means of special tools made up of a plurality of parts. This tool was relatively expensive to manufacture and was not entirely satisfactory from the standpoint of ease of operation.

It is therefore an object of my invention to provide a one piece clip-removing tool which is inexpensive to manufacture and easy to manipulate.

Another object is to provide a method of removing the U-shaped traction clips from the tire.

These and other objects will be more apparent after referring to the following specification and attached drawings, in which.

Figure 1:
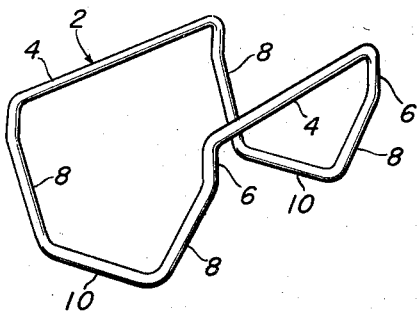
Figure 1 is a perspective view of a clip.
Figure 2:
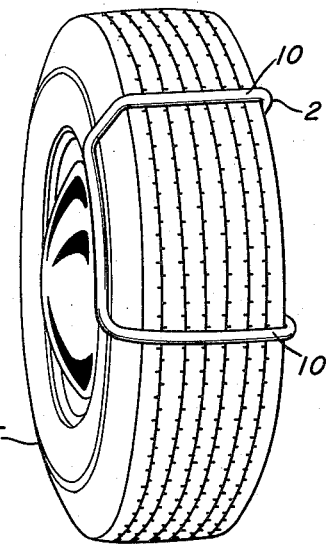
Figure 2 is a perspective view of a clip installed on a tire.

Referring more particularly to the drawings, the reference numeral 2 indicates a U-shaped traction clip which is adapted to be attached to a pneumatic tire T. The clip 2 is formed from a wire loop that is of generally rectangular shape and is provided with ends 4 and sides 6. The wire loop is bent into a U-shape with the legs 8 of the U in conjunction with the ends 4 forming gripping means for firmly fastening the clips to the tire. The base 10 of the clip acts as the traction portion thereof. The clip is forced over the tire and securely grasps the same. Because of its firm grasp on the tire it is difficult to remove the clips without a satisfactory tool. For this purpose I provide a tool 12 which is made of an elongated rigid steel rod. One end of the rod is provided with a wedge shaped flat portion 14 with a bend 16 being provided adjacent thereto. The bend 16 extends outwardly from the bar and has a height substantially greater than the diameter of the rod. The bend 16 is substantially V-shaped with the leg 18 adjacent the end 14 preferably being arranged at an angle 20 of approximately 30 degrees. The bend 16 provides a wire receiving groove 22. The other end of the rod is provided with a U-shaped bend 24 which is shown at right angles to the bend 16. However, the bend 24 could lie in the same plane as the bend 16.

Figure 4:
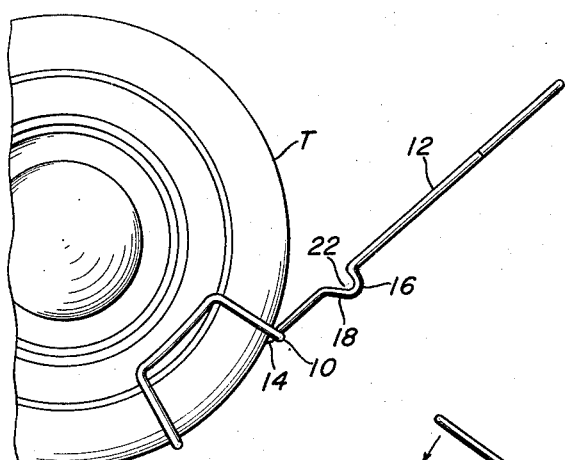
Figure 4 is a view showing the first step in removing a clip from a tire.
Figure 5:
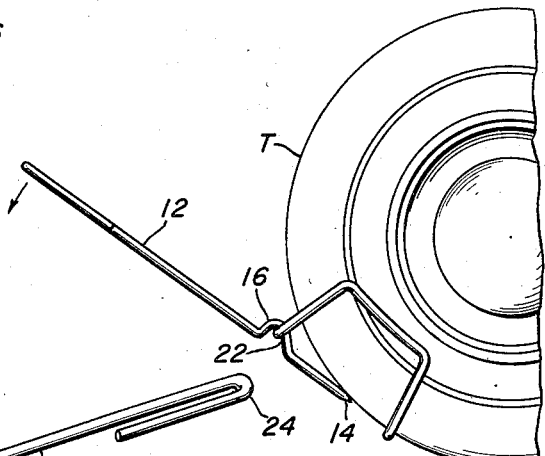
Figure 5 is a view showing a further step in removing a clip from a tire.
Figure 3:
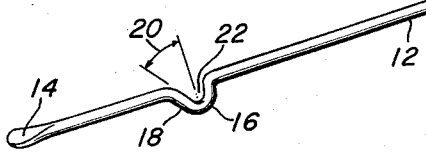
Figure 3 is a perspective view of my improved tool.

The operation of my device is as follows:

The end 14 of the bar is inserted under the wire clip at the traction portion 10, the wedge shape facilitating entry of the tool as shown in Figure 4. The bend 16 faces downwardly with the end of the tool under the base 10 of the clip. The outer end of the tool is then pried downwardly so as to partially remove the clip from the tire. The tool is then turned through 180 degrees so that the bend 16 extends upwardly as shown in Figure 5. The U-shaped bend 24 provides a firm grip so as to facilitate turning of the bar through 180 degrees. The tool is then moved inwardly to the position shown in Figure 5 with the clip portion 10 being received in the groove 22. The tool is then pressed downwardly until the clip is entirely removed from the tire. Engagement of the clip in the tool 22 prevents relative movement therebetween and facilitates removal of the clip. It will be understood that once the clip ends 4 are removed past the greatest width of the tire, removal of the clip presents no problem. If necessary each side of the clip can be removed separately in the manner described above.

While one embodiment of my invention has been shown and described it will be apparent that other adaptations and modifications may be made without departing from the scope of the following claims.

I claim:

1. The method of removing a U-shaped traction clip from a tire comprising inserting one end of an elongated rigid rod having a bend therein adjacent said one end between said clip and the outer periphery of said tire with the bend downwardly and outside the clip, prying downwardly on the free end of said rod to partially remove the clip from the tire, turning the bar through 180 degrees and moving it inwardly until the clip is engaged in said bend, and then prying downwardly on the free end of said rod to remove the clip from the tire.

2. A tool for removing a U-shaped wire traction clip from a tire comprising an elongated rigid rod adapted to be inserted between said clip and the outer periphery of said tire, said rod having a generally V-shaped wire receiving bend therein adjacent one end thereof extending outwardly from said rod in one direction, the height of said bend being substantially greater than the diameter of said rod, said rod having a straight portion on each side of said bend, the axes of said straight portions being substantially in alignment, and a wedge shaped flattened portion on the end of the rod adjacent said bend, the leg of the bend adjacent the said one end extending outwardly from said bar at an angle of approximately 30°.

References Cited in the file of this patent

UNITED STATES PATENTS

| | | |
|---|---|---|
| 1,377,014 | Juelfs | May 3, 1921 |
| 2,121,265 | Ruffcorn | June 21, 1938 |

FOREIGN PATENTS

| | | |
|---|---|---|
| 22,362 | Great Britain | Oct. 10, 1907 |